Nov. 21, 1967   J. C. PISTONE   3,353,839
LEVELING DEVICE FOR AUTOMOTIVE VEHICLES AND THE LIKE
Filed Oct. 22, 1965
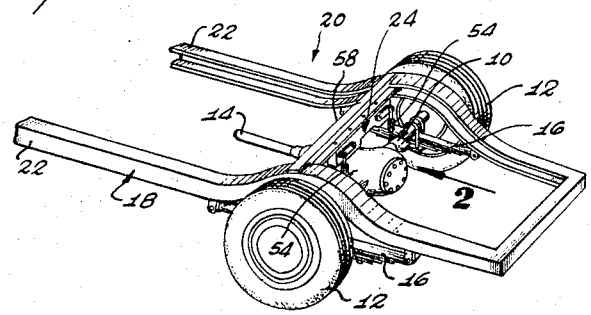
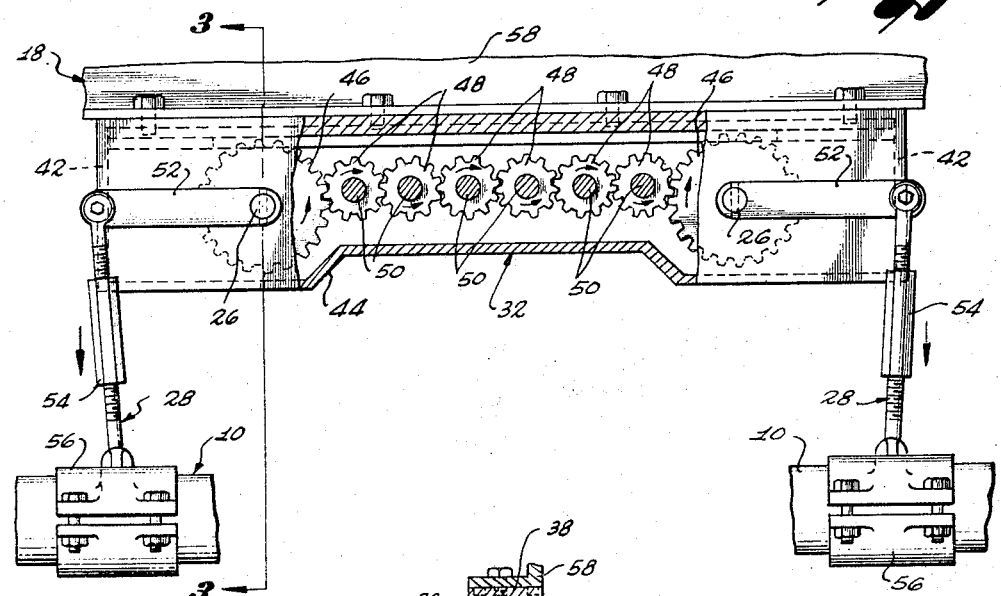
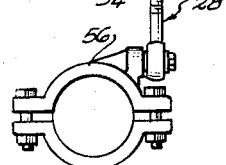
INVENTOR.
John C. Pistone United States Patent Office 3,353,839
Patented Nov. 21, 1967

3,353,839
LEVELING DEVICE FOR AUTOMOTIVE VEHICLES AND THE LIKE
John C. Pistone, 7540 Canby Ave., Reseda, Calif. 94570
Filed Oct. 22, 1965, Ser. No. 501,656
8 Claims. (Cl. 280—104)

ABSTRACT OF THE DISCLOSURE

A leveling device for maintaining the chassis and axles of an automotive vehicle in parallel relation, the device having a pair of rotary shafts mounted adjacent opposite sides of the chassis forwardly of the rear axle and extending longitudinally of the vehicle, a transverse arm rigid on each shaft, a link pivotally connected between the outer end of each arm and the adjacent end of the rear axle, and a gear train connecting the shafts in such manner that rotation of either shaft occasioned by relative displacement of the adjacent side of the chassis and the adjacent end of the rear axle through a given distance in either vertical direction effects corresponding rotation of the other shaft in a direction to cause relative displacement of the opposite side of the chassis and the opposite end of the rear axle through the same distance in the same vertical direction.

---

This invention relates generally to wheeled vehicles and has more particular reference to a novel leveling device for maintaining the chassis and an axle of the vehicle in generally parallel relation without interfering with the cushioning action of the vehicle spring suspension system.

As will appear from the ensuing description, the leveling device of this invention may be employed on both self-propelled vehicles, that is automotive vehicles such as passenger cars, trucks and the like, and towed vehicles, such as travel trailers, cargo trailers, and the like. Accordingly, the term "vehicle" is used herein in its generic sense to encompass all of these various types of vehicles.

The spring suspension system of a vehicle, while essential to a smooth ride, introduces certain undesirable handling characteristics into the operation of the vehicle, particularly during cornering. Thus, during cornering, a centrifugal force is exerted on the vehicle chassis which increases the loading on the vehicle wheels and springs adjacent the outside of the curve and reduces the loading on the opposite wheels and springs. As a consequence of this shift in spring loading, the chassis leans toward the outside of the curve, thereby further increasing the loading on the wheels adjacent the outside of the curve. In the case of an automotive vehicle, such as a passenger car or truck, this leaning of the chassis and shift in the loading on the vehicle wheels interferes with steering control. This is due to the fact that the increased loading and resultant deflection of the springs at the outside of the curve cause the adjacent end of the rear axle to shift rearwardly, while the reduced loading and deflection of the springs at the inside of the curve cause the adjacent end of the axle to shift forwardly. As a consequence, the axle is effectively rotated from its proper position of alignment perpendicular to the direction line of travel of the vehicle and in a direction to oppose the direction in which the vehicle is turning. Accordingly, it is difficult to properly steer such a vehicle during cornering unless the vehicle speed is reduced sufficiently to cause only negligible leaning of the chassis. Moreover, the increased wheel loading occasioned by leaning of the chassis during cornering increases tire wear to an extent which becomes very significant over a period of time, particularly if the route normally travelled by a vehicle has many curves. Leaning of a vehicle chassis during cornering also increases the tendency for the vehicle to turn over and thus limits the maximum safe cornering speed. In addition, leaning of the chassis produces an uncomfortable ride for the vehicle occupants and tends to create the undesirable sensation that the vehicle is about to turn over.

In the case of a towed vehicle or trailer, leaning of the trailer chassis also increases tire wear and the tendency for the trailer to turn over during cornering. Moreover, leaning of the trailer chassis during cornering intefers with proper steering contol of the towing vehicle. As a consequence, the safe cornering speed of the conventional automotive vehicle, when towing a trailer, is relatively low. The above undesirable effects, of course, are compounded when the chassis of both the trailer and towing vehicle lean during cornering.

Undesirable leaning of a vehicle chassis may also occur from other causes, such as non-uniform loading of the vehicle, gusts of wind, and so on.

It is a general object of this invention to provide a leveling device for vehicles which is effective to maintain the chassis and an axle of the vehicle in generally parallel relation, thereby to minimize or eliminate leaning of the chassis during cornering or as a result of the other causes stated above.

Another object of the invention is to provide a leveling device of the character described which is particularly suited for use on four-wheeled automotive vehicles and is adapted for installation between the front and rear wheels of the vehicle in such a way as to minimize or eliminate bending or twisting moments in the vehicle chassis during cornering.

An object of the invention, related to the foregoing object, is to provide a leveling device for four-wheeled automotive vehicles, which device is uniquely constructed to permit installation thereof between the front and rear wheels without interfering with the drive shaft of the vehicle.

A further object of the invention is to provide a leveling device of the character described which may be constructed as an article of original equipment for installation on a vehicle at the time of its manufacture or as an attachment for installation on a vehicle after its manufacture.

An object of the invention related to the foregoing object is to provide a leveling device which may be quickly and easily installed on an automotive vehicle, either during or subsequent to manufacture of the vehicle, without any substantial alteration of the vehicle or complicated machining operations.

Yet a further object of the invention is to provide a leveling device of the character described which is relatively simple in construction, compact, economical to manufacture, and otherwise ideally suited to its intended purposes.

Other objects, advantages, and features of the invention will become readily evident as the description proceeds.

With these and such other objects in view, the invention consists in the construction, arrangement, and combination of the various parts of the device whereby the objects contemplated are attained, as hereinafter set forth, pointed out in the appended claims, and illustrated in the accompanying drawings.

In these drawings:

FIGURE 1 is a perspective view of a leveling device according to the invention installed on a vehicle;

FIGURE 2 is an enlarged view looking in the direction of the arrow 2 in FIGURE 1 with parts broken away and omitted for the sake of clarity, FIGURE 3 is a section taken on line 3—3 in FIGURE 2; and FIGURE 4 is a diagrammatic perspective view illustrating the operation of the leveling device.

Referring first to FIGURE 1 of these drawings, there is illustrated the rear axle 10, rear wheels 12, drive shaft 14, rear springs 16, and rear end of the chassis 18 of a conventional four-wheeled automotive vehicle 20, such as a passenger car. The remainder of the vehicle has been omitted from the figure for the sake of clarity. It will be understood, however, that the vehicle 20 includes, in addition to the illustrated structure thereof, front wheels and springs at the front end of the chassis 18. The rear wheels 12 are mounted on the ends of the rear axle 10, outboard of the chassis 18. This chassis overlies the rear axle and includes longitudinal frame members 22 which are arched upwardly in the region of the rear axle, whereby these frame members extend up and over the axle, as shown. Rear springs 16 comprise leaf spring assemblies which are attached at their ends to the frame members 22, respectively, and at their centers to opposite ends of the axle 10. The rear springs 16, therefore, resiliently support the chassis 18 on the rear axle 10 in such a way that the chassis and axle are permitted to undergo relative vertical translational movement toward and away from one another as well as relative angular movement about an axis extending longitudinally of the vehicle.

As noted earlier, and as is well recognized in the art, during cornering of an automotive vehicle of the type illustrated, the vehicle chassis, or body, is subjected to a centrifugal force which increases the loading on the vehicle springs adjacent the outside of a curve and reduces the loading on the opposite springs in such a way that the chassis leans towards the outside of the curve. The undesirable effects of such leaning have already been discussed, and at any rate are well known. Accordingly, these effects will not be repeated. Suffice it to say at this point that under normal driving conditions of the illustrated vehicle 20, that is driving conditions under which the vehicle chassis 18 is not subjected to any unbalanced lateral loading, such as centrifugal force, the chassis and rear axle 10 are disposed in generally parallel relation. During cornering, on the other hand, the centrifugal force exerted on the chassis 18 tends to rotate the latter about a longitudinal axis of the vehicle relative to the rear axle 10 and thereby cause relative angular movement of these parts from their normal parallel relationship.

The present invention provides a leveling device 24 which is effective to maintain a normal parallel relationship between the rear axle 10 and the chassis 18 and, thereby, to minimize or prevent lateral leaning of the chassis during cornering and from the other causes mentioned earlier. Generally speaking, the leveling device 24 comprises a pair of rotary elements 26 which are mounted on the chassis 18 adjacent the ends, respectively, of the rear axle 10. Each rotary element 26 is operatively connected, by means 28, to the adjacent end of the axle in such manner that relative vertical movement of the adjacent axle end and the adjacent side of the chassis toward one another effects rotation of the element in one direction, and relative vertical movement of the adjacent axle end and the adjacent side of the chassis away from one another effects rotation of the element in the opposite direction. The rotary elements 26 are driveably coupled by torque transmitting means 30 in such a way that rotation of either rotary element 26 through a given angle in either of said directions of rotation thereof effects rotation of the other element through the same angle in the corresponding direction. It is evident, therefore, that any force, such as centrifugal force during cornering, which tends to cause relative angular movement of the axle 10 and chassis 18 about a longitudinal axis of the vehicle, and thereby, relative vertical movement between one end of the axle and the adjacent side of the chassis, produces a torque on the adjacent rotary element 26 in one direction or the other depending upon the direction of the force. This torque is transmitted to the other rotary element, through the torque transmitting means 30, and creates a force between the opposite end of the axle and the opposite side of the frame in a direction to maintain the axle and chassis in parallel relation. Similarly, any relative vertical movement between either end of the axle and the adjacent side of the chassis effects the same relative movement between the opposite end of the axle and the opposite side of the chassis, whereby the axle and chassis remain in parallel relation. As will appear from the ensuing description, an important feature of the leveling device 24 resides in the fact that the device remains effectively inoperative during relative translational movement of the chassis and axle in such a way that the chassis and axle remain parallel to one another, whereby the leveling device does not interfere with the normal cushioning action of the rear vehicle springs 16.

Referring now in greater detail to the leveling device 24, the latter will be observed to comprise a hollow elongate housing 32 having vertical side walls 34 and 36, respectively, and top and bottom walls 38 and 40, respectively. The bottom wall 40 is integrally formed with the side walls 34, 36. The top wall 38 is removably bolted to the upper edges of the side walls, as shown. The ends of the housing 32 are closed by integral end walls 42. For reasons which will appear presently, the bottom wall 40 and the lower edges of the side walls 34, 36 are centrally recessed at 44. The rotary elements 26 are located adjacent the ends of the housing 32 and comprise rotary shafts which extend normal to and are rotatably supported in bearings in the housing side walls 34, 36. One end of each shaft 26 extends externally of the housing.

The torque transmitting means 30 of the illustrated leveling device 24 comprises a gear train including a pair of relatively large diameter pinions 46 which are fixed to the shafts 26, respectively, within the housing 32. Pinions 46 have the same pitch diameter and the same number of teeth. Located between the pinions 46 are a number of smaller idler pinions 48 which are disposed in side by side relation lengthwise of the housing 32. Each idler pinion 48 is rotatably supported on a bearing shaft 50 extending normal to and supported at its ends on the housing side walls 34, 36. The several pinions 48 have the same pitch diameter and the same number of teeth. The adjacent pinions 48 are disposed in meshing engagement. The two outermost pinions 48 are disposed in meshing engagement with the two large pinions 46, respectively. It is evident from the foregoing description that rotation of either rotary shaft 26 thru a given angle in either direction drives the other rotary shaft thru the same angle in the opposite direction. For example, counterclockwise rotation of the lefthand shaft 26 in FIGURE 2 through a given angle drives the righthand shaft through the same angle in the clockwise direction. Similarly, clockwise rotation of the lefthand shaft thru a given angle drives the righthand shaft thru the same angle in a counterclockwise direction.

The connecting means 28 between the rotary elements or shafts 26 and the rear axle 10 comprise arms 52 of equal length rigid on and extending transversely of the external ends of the rotary shafts. Pivotally connected at its upper end to the outer end of each arm 52 is a link 54 which may include means for adjusting the length of the link as shown. The lower end of each link 54 is pivotally attached to an axle bracket 56. In the event that the leveling device 24 is installed on the vehicle 20 at the factory, the brackets 26 may be formed integrally with the axle. On the other hand, if the leveling device is constructed as an attachment for installation on the vehicle subsequent to its manufacture, the brackets 56 may be separately constructed, as shown, to permit them to be mounted on the axle of an existing vehicle.

The housing 32 of the leveling device 24 is mounted below and extends crosswise of the chassis 18, adjacent and generally parallel to the rear axle 10. The housing may be mounted on the chassis in any convenient way. In the drawings, for example, the housing is bolted to the underside of a channel member 58 which extends crosswise of the chassis and is rigidly attached at its ends to the chassis frame members 22. For reasons to be explained presently, the housing 32 is preferably located forwardly of the rear axle 10 as shown in FIGURE 1. In this case, preferably, the points of pivotal attachment between the connecting links 54 and the axle brackets 56 are located at the front side of the axle, as shown in FIGURE 3, and the arms 52 are located at the rear side of the housing 32.

The leveling device 24 is installed on the vehicle 20 in such a way that its housing 32 is approximately centered between the sides of the vehicle chassis 18 and the ends of the housing are located over the axle brackets 56 which are disposed adjacent the ends of the axle. The connecting links 54 are adjusted in length so that under normal balanced loading of the vehicle, the links are approximately equal in length and the arms 52 extend generally parallel to the longitudinal axis of the housing 32 and toward the adjacent ends of the housing, as shown. It is evident from FIGURE 2 that downward movement of the left side of the chassis 18 toward the left end of the axle 10 effects clockwise rotation of the lefthand shaft 26 and upward movement of the latter side of the chassis away from the axle effects counterclockwise rotation of the lefthand shaft. Similarly, downward movement of the right side of the chassis toward the righthand end of the axle effects counterclockwise rotation of the righthand shaft 26 and upward movement of the latter side of the chassis away from the axle effects clockwise rotation of the righthand shaft. It is further evident that any rotation of either shaft 26 occasioned by relative vertical displacement of the adjacent end of the axle 10 and the adjacent side of the chassis 18 is effective to drive the other shaft 26 through an equal angle in the opposite direction.

The operation of leveling device 24 is believed to be obvious from the preceding description. Thus, assume first that the vehicle 20 makes a righthand turn. The vehicle chassis 18 is then subjected to a centrifugal force which produces a counterclockwise moment on the chassis, as the latter is viewed in FIGURE 2. This moment tends to rotate the left side of the chassis downwardly toward the rear axle 10 and the right side of the chassis upwardly away from the axle. Under these conditions, the lefthand connecting link 54 is loaded in compression and thus exerts an upward thrust on the outer end of the lefthand arm 52, thereby producing a clockwise torque on the lefthand shaft 26. This is transmitted to the righthand shaft 26 through the gear train 30 and produces a counterclockwise torque on the latter shaft. The righthand connecting link 54 is thereby loaded in tension and exerts a downward reaction thrust on the outer end of the righthand arm 52. The upward thrust of the lefthand connecting link 54 on the lefthand arm 52 and the downward thrust of the righthand connecting link on the righthand arm are approximately equal in magnitude and act in opposite directions on the gear train 30. Accordingly, the gears of the train tend to remain relatively stationary and serve merely as a means for equalizing the forces in the connecting links. These forces, therefore, react on the chassis 18 through the points of engagement of the shafts 26 with the housing 32 of the leveling device and produce on the chassis a clockwise moment equal and opposite to the counterclockwise moment produced by centrifugal force during cornering. As a consequence, the chassis is constrained to remain substantially parallel to the rear axle 10. The space inbetween the chassis and axle remains substantially unchanged. It is evident, of course, that the leveling device reacts in a similar way to maintain the chassis and axle in parallel relation during lefthand cornering.

It is significant to note that the leveling device 24 does not in any way impede relative vertical translation or movement of the axle 10 and chassis 18, that is relative vertical movement in which the axle and chassis remain parallel. Accordingly, the leveling device does not interfere with the normal cushioning action of the rear vehicle springs 16 and thus does not detract from the smooth ride of the vehicle.

Assume now that the vehicle 20 is unevenly loaded in such a way that the vertical load on the lefthand side of the chassis 18 in FIGURE 2 is substantially greater than the vertical load on the righthand of the chassis. This unbalanced loading will cause the lefthand of the chassis to drop toward the axle 10. Under these conditions, a clockwise torque is produced in the lefthand shaft 26, which is transmitted to and produces a counterclockwise torque in the righthand shaft. The counterclockwise torque thus produced in the righthand shaft reacts on the axle 10 through the adjacent connecting link 54 and operates, in effect, to pull down the righthand side of the chassis a distance substantially equal to the drop in the lefthand side of the chassis. Accordingly, the chassis remains substantially parallel to the axle under all conditions of loading.

As noted earlier, during cornering of the vehicle 20, the centrifugal force active on the vehicle body produces a moment in one direction or the other on the chassis 18, depending upon the direction in which the vehicle turns. The leveling mechanism 24 reacts to this leaning moment on the chassis by exerting an upward leveling force on one side of the chassis and a downward leveling force on the opposite side of the chassis, which leveling forces cooperate to produce a leveling moment on the chassis equal and opposite to that produced by the centrifugal force. In FIGURE 4, these leveling forces are represented by the arrows $F_1$ and $F_2$. It is evident that these illustrated leveling forces correspond to those produced on the chassis 18 by the leveling device 24 during a righthand turn. It will be observed in this latter figure that the axle 10 and chassis 18 form an effective lever system in which the chassis functions as a lever which is fulcrumed on the axle for rocking movement both about the axle axis $a$ and about the longitudinal axis $b$ of the vehicle. As is obvious from FIGURE 4, the leveling forces $F_1$ and $F_2$ are effective to produce a moment on the chassis 18 about the longitudinal axis $b$, regardless of the points of application of these forces to the chassis. Depending on the locations of these points of applications of the forces $F_1$ and $F_2$ relative to the axle 10, the forces may also produce moments on the chassis about the transverse axis $a$. Thus, if the forces $F_1$ and $F_2$ act on the chassis directly over the axle, they produce no substantial moment on the chassis about the axis $a$. If, on the other hand, these forces act on the chassis forwardly of the axle, as shown in FIGURE 4, each force does produce on the chassis a moment about the axis $a$. In this case, for example, the force $F_1$ produces on the chassis a moment which tends to rotate upwardly the front end of its adjacent chassis frame member 22. The force $F_2$, on the other hand, produces on the chassis a moment tending to rotate downwardly the front end of its adjacent frame member 22.

Now it is evident that the centrifugal force active on the vehicle 20 during cornering tends to rotate both the front and rear ends of the chassis 18 about the longitudinal axis $b$. It is further evident that if the leveling forces $F_1$ and $F_2$ act on the chassis 18 directly over the rear axle 10, these forces restrain lateral leaning of the vehicle body toward the outside of the curve solely by the opposing moment which the forces product about the longitudinal axis $b$. Under these conditions, the chassis 18 is obviously subjected to a substantial twisting moment about the axis $b$. In other words, the leveling device 24 will retain the rear end of the chassis in parallel relation to the rear axle 10, while the centrifugally induced moment on the front end of the chassis will tend to twist the latter end relative to the rear end.

Assume now that the leveling forces $F_1$ and $F_2$ act on the chassis 18 forwardly of the rear axle 10, as shown in FIGURE 4. In this case, during cornering, the forces produce on the chassis a moment about the longitudinal axis $b$ in opposition to that produced by centrifugal force, as before. Now, however, the leveling forces produce on the chassis 18 additional moments which further resist twisting of the front end of the chassis relative to the rear end. During a righthand turn, for example, the leveling force $F_1$ produces an upward moment on its adjacent chassis frame member 22 about the axis $a$ and, thereby, an upward force on the front end of this frame member. Similarly, the leveling force $F_2$ produces a downward moment on its adjacent frame member 22 about the axis $a$ and, thereby, a downward force on the front end of the latter frame member. These forces on the front ends of the frame member 22 create on the front end of the chassis an additional moment in opposition to that produced by centrifugal force on the chassis during cornering. A similar action occurs during a lefthand turn. It is evident, therefore, that the twisting moment which occurs in the chassis 18, about the longitudinal axis $b$, as a result of the leveling forces exerted on the chassis by the leveling device 24 during the cornering is minimized when these leveling forces are exerted on the chassis forwardly of the rear axle.

This application of the leveling forces $F_1$ and $F_2$ to the chassis 18 forwardly of the rear axle 10 is accomplished by attaching the housing 32 of the leveling device to the chassis at a position forwardly of the axle, as illustrated in FIGURE 1. It is evident, of course, that the greater the longitudinal spacing between the rear axle 10 and the housing 32 of the leveling device, the smaller will be the twisting moment created in the chassis 18 during cornering. In practice, however, this spacing is limited owing to the fact that an excessive spacing between the axle and the housing of the leveling device will result in the creation of undesirable bending and twisting moments in the connecting linkages 28 between the shafts 26 of the device and the rear axle 10. The maximum spacing between the rear axle 10 and the housing 32 is further limited by the fact that the clearance space between the drive shaft 14 of the vehicle and the chassis 18, forwardly of the upwardly arched portions of the chassis frame members 22 is too small to accommodate the housing. In this regard, however, it is significant to note that the vertical dimensions of the central portion of the housing 32, which extends over the drive shaft 14, is minimized by the small diameter of the idler gears 48 in the gear train 30 and the cut away 44 in the underside of the housing. This minimizes the clearance space between the drive shaft 14 and the chassis 18 required to accommodate the housing and, further, avoids the possibility of impact of the housing against the drive shaft during vertical springing movement of the chassis.

At this point, attention is directed to the fact that the links 54 extend at acute angles relative to the rear axle 10. Because of this relative angular disposition of the links, the latter are effective to resist relative lateral movement of the chassis 18 with respect to the axle.

It is now evident, therefore, that the invention herein described and illustrated is fully capable of attaining the several objects and advantages preliminarily set forth.

While the presently preferred embodiment of the invention has been disclosed for illustrative purposes, it is evident that various modifications in the design, arrangement of parts, and instrumentalities of the invention are possible within the spirit and scope of the following claims.

What is claimed as new in support of Letters Patent is:

1. A leveling device to be mounted on a vehicle having an axle, wheels on the ends of said axle, a chassis overlying said axle, and springs mounting said chassis on said axle, said device being adapted to retain said chassis and axle in parallel relation and comprising:
   an elongate hollow housing;
   means for mounting said housing on the underside of said chassis;
   a pair of parallel rotary shafts mounted within said housing adjacent the ends thereof;
   torque transmitting means driveably coupling said shafts in such manner that rotation of either shaft in a given direction effects rotation of the other shaft in the opposite direction, said torque transmitting means comprising a first pinion rigid on each shaft and a number of idler pinions rotatably mounted within said housing between said shafts and disposed in driving relation with one another and with said first pinions;
   a transverse arm rigid on each shaft, said arms being rotatable to positions wherein both of said arms extend generally parallel to the longitudinal axis of said housing and toward the adjacent ends of said housing; and
   a link pivotally connected at one end to the outer end of each arm and having means at its other end for connection to the vehicle axle.

2. In a vehicle including an axle, wheels on the ends of said axle, a chassis overlying said axle, and springs resiliently mounting said chassis on said axle, leveling means for maintaining said chassis and axle in generally parallel relation, comprising:
   a pair of rotary shafts mounted on said chassis at opposite sides thereof and adjacent said axle and extending longitudinally of said chassis,
   a transverse arm rigid on each shaft and extending laterally of said chassis,
   a link pivotally connected between the outer end of each arm and the adjacent end of said axle, and
   torque transmission means connecting said shafts in such manner that rotation of either shaft occasioned by relative displacement of the adjacent side of said chassis and the adjacent end of said axle through a given distance in either vertical direction effects rotation of the other shaft in a direction to cause relative displacement of the opposite side of said chassis at the opposite end of said axle through the same distance in the same vertical direction.

3. The combination according to claim 2 wherein:
   said torque transmission means comprise pinions rigid on said shafts, respectively, and a number of idler pinions rotatably mounted on said chassis between said shafts and disposed in meshing engagement with one another and with said shaft pinions.

4. The combination according to claim 2 wherein:
   said links extend at acute angles relative to said axle so as to resist relative lateral movement of said chassis with respect to said axle.

5. In a vehicle including front and rear axles, wheels on the ends of said axles, a chassis overlying said axles, and springs resiliently mounting said chassis on said axles, leveling means for maintaining said chassis and axles in generally parallel relation, comprising:
   a pair of rotary shafts mounted on said chassis adjacent opposite sides of said chassis and forwardly of said rear axle and extending longitudinally of said chassis,
   a transverse arm rigid on each shaft and extending laterally of said chassis,
   a link pivotally connected between the outer end of each arm and the adjacent end of said rear axle, and
   torque transmission means connecting said shafts in such manner that rotation of either shaft occasioned by relative displacement of the adjacent side of said chassis and the adjacent end of said rear axle through a given distance in either vertical direction effects corresponding rotation of the other shaft in a direction to cause relative displacement of the opposite side of said chassis and the opposite end of said rear axle through the same distance in the same vertical direction.

6. The combination according to claim 5 wherein:
said arms extend away from one another toward their respective adjacent sides of said chassis, and
said torque transmission means connect said shafts in such manner that rotation of either shaft in a given direction causes rotation of the other shaft in the opposite direction.

7. The combination according to claim 5 wherein:
said torque transmission means comprise a gear train including pinions rigid on said shafts, respectively, and a number of idler pinions rotatably mounted on said chassis between said shafts and disposed in meshing engagement with one another and with said shaft pinions.

8. The combintaion according to claim 7 wherein:
said vehicle includes a drive shaft extending forwardly from said rear axle, and
said idler pinions are arranged in a row extending laterally of said chassis between the latter and said drive shaft.

References Cited

UNITED STATES PATENTS

| | | | |
|---|---|---|---|
| 1,297,325 | 3/1919 | Coleman | 267—11 |
| 2,094,174 | 9/1937 | Kittel | 267—11 |
| 2,733,934 | 2/1956 | Muller | 267—11 X |
| 2,815,202 | 12/1957 | Post | 267—11 |

BENJAMIN HERSH, *Primary Examiner.*

PHILIP GOODMAN, *Examiner.*